US010753662B2

(12) United States Patent
Nakata et al.

(10) Patent No.: US 10,753,662 B2
(45) Date of Patent: Aug. 25, 2020

(54) REFRIGERATION APPARATUS

(71) Applicant: DAIKIN INDUSTRIES, LTD., Osaka-shi, Osaka (JP)

(72) Inventors: Takahiro Nakata, Osaka (JP); Hiroshi Itou, Osaka (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 100 days.

(21) Appl. No.: 15/771,293

(22) PCT Filed: Oct. 25, 2016

(86) PCT No.: PCT/JP2016/081631
§ 371 (c)(1),
(2) Date: Apr. 26, 2018

(87) PCT Pub. No.: WO2017/073577
PCT Pub. Date: May 4, 2017

(65) Prior Publication Data
US 2018/0313592 A1 Nov. 1, 2018

(30) Foreign Application Priority Data
Oct. 30, 2015 (JP) .................................. 2015-215168

(51) Int. Cl.
*F24F 11/89* (2018.01)
*F25B 49/02* (2006.01)
(Continued)

(52) U.S. Cl.
CPC ............ *F25B 49/022* (2013.01); *F24F 11/89* (2018.01); *F25B 47/02* (2013.01); *F25B 47/025* (2013.01);
(Continued)

(58) Field of Classification Search
CPC ................. F25D 49/022; F25D 47/025; F25D 2600/0253
See application file for complete search history.

(56) References Cited

U.S. PATENT DOCUMENTS 5,285,646 A * 2/1994 TaeDuk .................. F25B 13/00
62/115

FOREIGN PATENT DOCUMENTS

EP 2918953 A1 9/2015
JP 60-069446 A 4/1985
(Continued)

OTHER PUBLICATIONS

Extended European Search Report for Application No. 16859807.6, dated Jul. 17, 2018.
(Continued)

Primary Examiner — Elizabeth J Martin
Assistant Examiner — Nael N Babaa
(74) Attorney, Agent, or Firm — Birch, Stewart, Kolasch & Birch, LLP

(57) ABSTRACT

An air conditioner that is a refrigeration apparatus has, in a refrigerant circuit, a compressor, an outdoor heat exchanger that functions as an evaporator in a heating operation, an indoor heat exchanger that functions as a condenser in the heating operation, and a four way valve. The refrigerant circuit is configured in such a way that a high-pressure value of the refrigerant circuit in a defrost operation is lower than a high-pressure value of the refrigerant circuit in the heating operation. An end-of-defrost frequency decrease rate, which is a rate of decrease in the operating frequency of the compressor in the defrost operation, is set faster than a normal frequency decrease rate, which is a rate of decrease in the operating frequency of the compressor in the heating operation.

6 Claims, 8 Drawing Sheets

(51) Int. Cl.
*F25B 47/02* (2006.01)
*F25B 13/00* (2006.01)

(52) U.S. Cl.
CPC ........... *F25B 13/00* (2013.01); *F25B 2500/12* (2013.01); *F25B 2600/022* (2013.01); *F25B 2600/0253* (2013.01); *F25B 2700/2103* (2013.01); *F25B 2700/2104* (2013.01); *F25B 2700/2106* (2013.01); *F25B 2700/21151* (2013.01); *F25B 2700/21173* (2013.01); *Y02B 30/741* (2013.01)

(56) References Cited

FOREIGN PATENT DOCUMENTS

| | | |
|---|---|---|
| JP | 5-346256 A | 12/1993 |
| JP | 2008-256264 A | 10/2008 |
| JP | 2014-129957 A | 7/2014 |

OTHER PUBLICATIONS

International Preliminary Report on Patentability and English translation of the Written Opinion of the International Searching Authority (Forms PCT/IB/338, PCT/IB/373 and PCT/ISA/237) for Application No. PCT/JP2016/081631, dated May 11, 2018.
International Search Report (PCT/ISA/210) issued in PCT/JP2016/081631, dated Jan. 17, 2017.

* cited by examiner

REFRIGERATION APPARATUS

TECHNICAL FIELD

The present invention relates to a refrigeration apparatus that uses a compressor to cause refrigerant in a refrigerant circuit to circulate.

BACKGROUND ART

Conventionally, among refrigeration apparatus capable of performing a heating operation that uses a compressor to cause refrigerant in a refrigerant circuit to circulate and uses an indoor heat exchanger to heat indoor air, there are refrigeration apparatus in which a defrost operation for removing frost sticking to an outdoor heat exchanger in the refrigerant circuit is performed. For example, patent document 1 (Japanese Patent Unexamined Publication No. 2014-129957) discloses a technology which, in the defrost operation, removes frost sticking to the outdoor heat exchanger by using a four way valve to switch the flow of refrigerant in the refrigerant circuit to perform the same refrigeration cycle as in a cooling operation. In the refrigeration apparatus disclosed in patent document 1, when the defrost operation ends, the refrigeration apparatus reverts back to the heating operation so that heating of the indoor is performed. Additionally, in this refrigeration apparatus, in order to reduce noise that occurs when reverting to the heating operation after the end of the defrost operation, stopping the compressor before entering the heating operation is performed. Furthermore, reducing the acceleration rate of the compressor after reverting to the heating operation is performed.

SUMMARY OF INVENTION

Technical Problem

However, although the refrigeration apparatus disclosed in patent document 1 can reduce noise that occurs when reverting to the heating operation, improvement in terms of ensuring heating capacity becomes difficult.

The present invention relates to a problem of providing a refrigeration apparatus that suppresses noise that occurs when reverting to the heating operation and with which it is easy to ensure heating capacity.

Solution to Problem

A refrigeration apparatus pertaining to a first aspect of the invention is a refrigeration apparatus including a refrigerant circuit in which a vapor compression refrigeration cycle is performed, the refrigeration apparatus comprising: a compressor that is provided in the refrigerant circuit and whose operating frequency is capable of being changed; an evaporator that is provided in the refrigerant circuit and is for performing heat exchange by causing refrigerant circulated by the compressor to evaporate in a heating operation; a condenser that is provided in the refrigerant circuit and is for performing heat exchange by causing the refrigerant circulated by the compressor to condense in the heating operation; and a switching mechanism that is provided in the refrigerant circuit and is for switching the flow of the refrigerant in the refrigerant circuit when switching between the heating operation using the condenser and a defrost operation that defrosts the evaporator, wherein the refrigerant circuit is configured in such a way that a high-pressure value of the refrigerant circuit in the defrost operation is lower than a high-pressure value of the refrigerant circuit in the heating operation, and an end-of-defrost frequency decrease, which is a rate of decrease in the operating frequency of the compressor in the defrost operation, is set faster than a normal frequency decrease rate, which is a rate of decrease in the operating frequency of the compressor in the heating operation.

In this refrigeration apparatus, because the end-of-defrost frequency decrease rate is faster than the normal frequency decrease rate, the compressor can be made to quickly reach an operating frequency at which pressure equalization of the switching mechanism is possible when ending the defrost operation, so the amount of time until switching the switching mechanism can be shortened.

A refrigeration apparatus pertaining to a second aspect of the invention is the refrigeration apparatus pertaining to the first aspect, wherein the end-of-defrost frequency decrease rate is set to a decrease rate that is two or more times the normal frequency decrease rate.

In this refrigeration apparatus, because the end-of-defrost frequency decrease rate is set to a decrease rate that is two or more times the normal frequency decrease rate, the effect of shortening the defrost operation time becomes greater.

A refrigeration apparatus pertaining to a third aspect of the invention is the refrigeration apparatus pertaining to the first aspect or the second aspect, wherein the compressor maintains an operating frequency equal to or greater than a predetermined value, without stopping, when reverting from the defrost operation to the heating operation.

In this refrigeration apparatus, because the compressor is arranged and configured to maintain an operating frequency equal to or greater than a predetermined value, without stopping, when reverting from the defrost operation to the heating operation, the compressor is driven at the operating frequency equal to or greater than the predetermined value when it has reverted to the heating operation, so in comparison to the conventional case where, for example, the compressor had stopped when reverting to the heating operation, the compressor can be increased in a short amount of time to the necessary operating frequency.

A refrigeration apparatus pertaining to a fourth aspect of the invention is the refrigeration apparatus pertaining to the third aspect, wherein after the operating frequency has been changed at the end-of-defrost frequency decrease rate, the compressor is arranged and configured to maintain a constant operating frequency over a predetermined amount of time before entering the heating operation.

In this refrigeration apparatus, by maintaining a constant operating frequency over a predetermined amount of time before entering the heating operation after the operating frequency has been changed at the end-of-defrost frequency decrease rate, pressure equalization of the switching mechanism can be sufficiently performed.

Advantageous Effects of Invention

In the refrigeration apparatus pertaining to the first aspect of the invention, noise that occurs when reverting to the heating operation is suppressed, and it becomes easy to ensure heating capacity.

In the refrigeration apparatus pertaining to the second aspect of the invention, it becomes easy to improve heating capacity.

In the refrigeration apparatus pertaining to the third aspect of the invention, it becomes easy to increase the operating frequency of the compressor when the refrigeration apparatus has reverted to the heating operation, and it becomes easy to ensure a low-temperature heating capacity.

In the refrigeration apparatus pertaining to the fourth aspect of the invention, noise that occurs in the switching mechanism when reverting to the heating operation can be suppressed without stopping the compressor when reverting to the heating operation.

BRIEF DESCRIPTION OF DRAWINGS

DESCRIPTION OF EMBODIMENT (1) General Overview of Configuration of Air Conditioner A refrigeration apparatus pertaining to an embodiment of the invention will be described below using an air conditioner as an example. A general overview of the configuration of the air conditioner pertaining to this embodiment is shown in FIG. 1 and FIG. 2. An air conditioner 1 shown in FIG. 1 is equipped with an indoor unit 3 attached, for example, to a wall surface WL of a indoor and an outdoor unit 2 installed outdoors. It will be noted in regard to FIG. 1 that the outdoor unit 2 is depicted with dashed lines because the outdoor unit 2 is located outdoors on the opposite side of the indoor unit 3 across the wall surface WL. In FIG. 2 is shown the circuit configuration of the air conditioner 1. The air conditioner 1 is equipped with a refrigerant circuit 10 and can execute a vapor compression refrigeration cycle by causing refrigerant in the refrigerant circuit 10 to circulate. In order to form the refrigerant circuit 10 in which the refrigerant circulates, the indoor unit 3 and the outdoor unit 2 are connected to each other by communication piping 4. Furthermore, the air conditioner 1 is equipped with a control unit 50 to control the devices inside. A remote controller 5 is included in the air conditioner 1, and the remote controller 5 has the function of communicating with the control unit 50 using infrared, for example. Consequently, the user can use the remote controller 5 to perform various settings with respect to the air conditioner 1.

(1-1) Refrigerant Circuit 10

Figure 1:
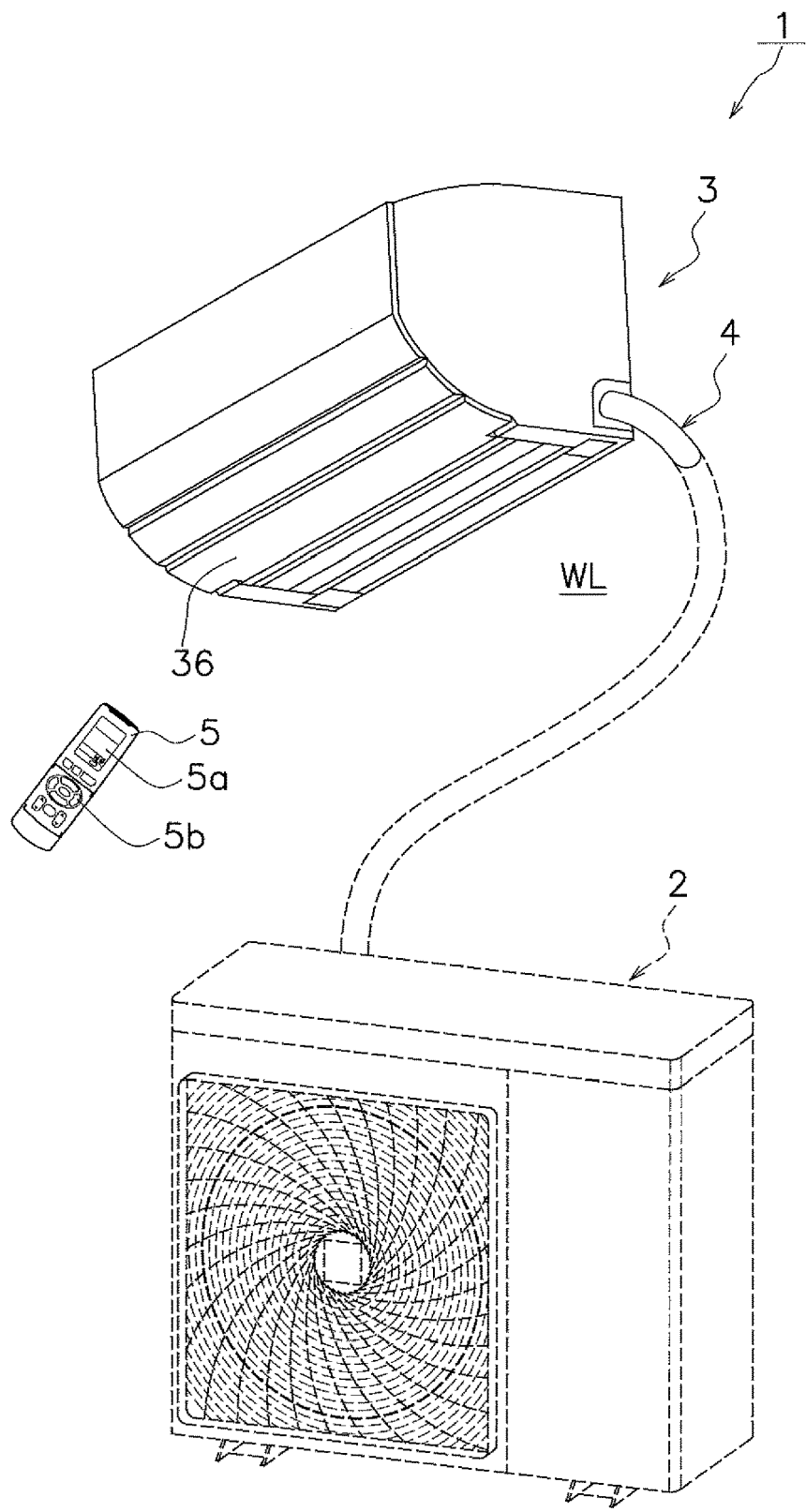
FIG. 1 is a perspective view showing the outer appearance of an air conditioner pertaining to an embodiment.

The refrigerant circuit 10 is equipped with a compressor 11, a four way valve 12, an outdoor heat exchanger 13, an expansion mechanism 14, an accumulator 15, and an indoor heat exchanger 16. The compressor 11 discharges, from a discharge port to a first port of the four way valve 12, refrigerant that it has sucked in from a suction port and compressed. The four way valve 12 further has a second port connected to the outdoor heat exchanger 13, a third port connected to the accumulator 15, and a fourth port connected to the indoor heat exchanger 16.

When the air conditioner 1 performs a heating operation, the four way valve 12 causes the refrigerant to circulate between the first port and the fourth port while simultaneously causing the refrigerant to circulate between the second port and the third port as indicated by the dashed lines. Furthermore, when the air conditioner 1 performs a cooling operation and when the air conditioner 1 performs a reverse cycle defrost operation, the four way valve 12 causes the refrigerant to circulate between the first port and the second port while simultaneously causing the refrigerant to circulate between the third port and the fourth port as indicated by the solid lines.

The outdoor heat exchanger 13 has a gas-side inlet/outlet for mainly causing gas refrigerant to circulate between the outdoor heat exchanger 13 and the second port of the four way valve 12, and also has a liquid-side inlet/outlet for mainly causing liquid refrigerant to circulate between the outdoor heat exchanger 13 and the expansion mechanism 14. The outdoor heat exchanger 13 causes heat exchange to be carried out between outdoor air and the refrigerant flowing through heat transfer tubes (not shown in the drawings) connected between the liquid-side inlet/outlet and the gas-side inlet/outlet of the outdoor heat exchanger 13.

The expansion mechanism 14 is disposed between the outdoor heat exchanger 13 and the indoor heat exchanger 16. The expansion mechanism 14 has the function of causing the refrigerant flowing between the outdoor heat exchanger 13 and the indoor heat exchanger 16 to expand to thereby reduce the pressure of the refrigerant.

The indoor heat exchanger 16 has a liquid-side inlet/outlet for causing liquid refrigerant to circulate between the indoor heat exchanger 16 and the expansion mechanism 14, and also has a gas-side inlet/outlet for causing gas refrigerant to circulate between the indoor heat exchanger 16 and the fourth port of the four way valve 12. The indoor heat exchanger 16 causes heat exchange to be carried out between indoor air and the refrigerant flowing through heat transfer tubes (not shown in the drawings) connected between the liquid-side inlet/outlet and the gas-side inlet/outlet of the indoor heat exchanger 16.

The accumulator 15 is disposed between the third port of the four way valve 12 and the suction port of the compressor 11. In the accumulator 15, the refrigerant flowing from the third port of the four way valve 12 to the compressor 11 is separated into gas refrigerant and liquid refrigerant. Additionally, mainly the gas refrigerant is supplied from the accumulator 15 to the suction port of the compressor 11.

The outdoor unit 2 is equipped with an outdoor fan 21 that generates an airflow of outdoor air that passes through the outdoor heat exchanger 13 in order to promote heat exchange between the refrigerant flowing through the heat transfer tubes and the outdoor air. The outdoor fan 21 is driven by an outdoor fan motor 21a whose rotational speed can be changed. Furthermore, the indoor unit 3 is equipped with an indoor fan 31 that generates an airflow of indoor air that passes through the indoor heat exchanger 16 in order to promote heat exchange between the refrigerant flowing through the heat transfer tubes and the indoor air. The indoor fan 31 is driven by an indoor fan motor 31*a* whose rotational speed can be changed.

As shown in FIG. 1, an air direction adjustment blade 36 is provided in the indoor unit 3. The indoor unit 3 shown in FIG. 1 is in a state in which its air outlet is closed off by the air direction adjustment blade 36. In the heating operation, the air direction adjustment blade 36 is driven by an air direction adjustment blade drive motor 37 (see FIG. 3) so that warm air is blown out from the opened air outlet. Indoor air sucked into the indoor unit 3 is sucked in from an air inlet (not shown in the drawings) located in the top of the indoor unit 3.

(1-2) General Overview of Configuration of Control System of Refrigerant Circuit 10

Figure 3:
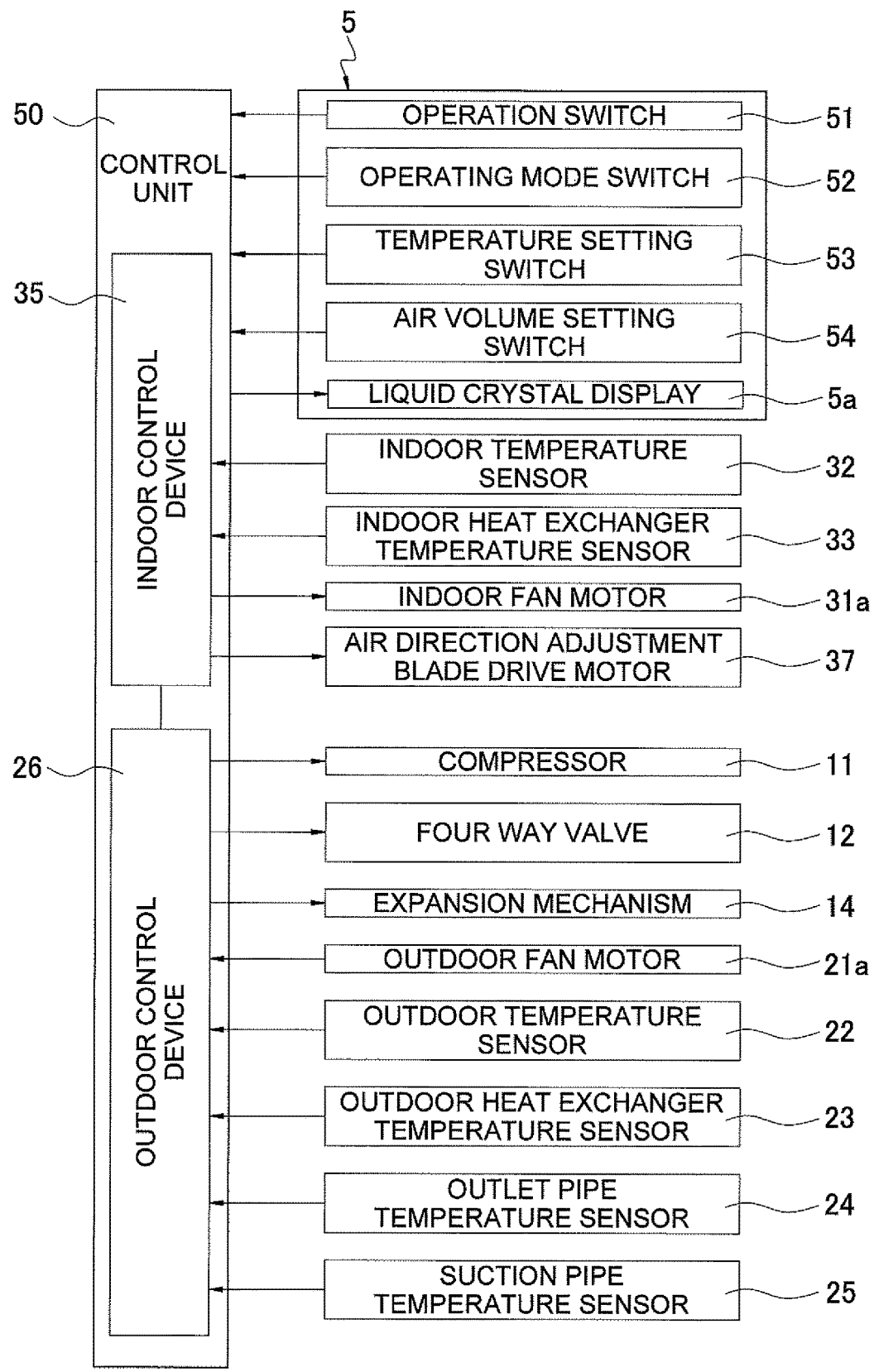
FIG. 3 is a block diagram showing the general configuration of a control system of the air conditioner.

As shown in FIG. 3, the control unit 50 has an outdoor control device 26 built into the outdoor unit 2 and an indoor control device 35 built into the indoor unit 3. The outdoor control device 26 and the indoor control device 35 are connected to each other by a signal line and are configured in such a way that they can send signals to and receive signals from each other.

The outdoor control device 26 of the outdoor unit 2 controls the compressor 11, the four way valve 12, the expansion mechanism 14, and the outdoor fan 21, among other things. For that purpose, the outdoor unit 2 is equipped with an outdoor temperature sensor 22 for measuring the temperature of the outdoor air, an outdoor heat exchanger temperature sensor 23 for measuring the temperature of the refrigerant flowing through a particular place in the outdoor heat exchanger 13, an outlet pipe temperature sensor 24 for detecting the temperature of the refrigerant flowing out from the gas-side inlet/outlet of the outdoor heat exchanger 13 functioning as an evaporator in the heating operation, and a suction pipe temperature sensor 25 for detecting the temperature of the gas refrigerant sucked into the compressor 11. Additionally, the outdoor control device 26 is connected to the outdoor temperature sensor 22 and the outdoor heat exchanger temperature sensor 23 in order to receive signals relating to the temperatures that the outdoor temperature sensor 22 and the outdoor heat exchanger temperature sensor 23 have measured. The outdoor control device 26 includes a CPU (not shown in the drawings) and a memory (not shown in the drawings), for example, and is configured to be able to control the outdoor unit 2 in accordance with a stored program or the like.

The indoor control device 35 of the indoor unit 3 controls the indoor fan 31 and the like, among other things. For that purpose, the indoor unit 3 is equipped with an indoor temperature sensor 32 for measuring the temperature of the indoor air and an indoor heat exchanger temperature sensor 33 for measuring the temperature of the refrigerant flowing through a particular place in the indoor heat exchanger 16. Additionally, the indoor control device 35 is connected to the indoor temperature sensor 32 and the indoor heat exchanger temperature sensor 33 in order to receive signals relating to the temperatures that the indoor temperature sensor 32 and the indoor heat exchanger temperature sensor 33 have measured. The indoor control device 35 includes a CPU (not shown in the drawings) and a memory (not shown in the drawings), for example, and is configured to be able to control the indoor unit 3 in accordance with a stored program or the like.

The remote controller 5 has a liquid crystal display 5*a* and buttons 5*b* shown in FIG. 1. Provided in the remote controller 5 are an operation switch 51, an operating mode switch 52, a temperature setting switch 53, and an air volume setting switch 54, and the user can use the buttons 5*b* to operate these switches.

The operation switch 51 is a switch for switching between operating and stopping the air conditioner 1, so that each time the operation switch 51 is operated, the air conditioner 1 switches between operating and stopping. The operating mode switch 52 is used, for example, when selecting the cooling operation and the heating operation. The temperature setting switch 53 is a switch used for the user to input the desired indoor temperature. Furthermore, the air volume setting switch 54 is a switch used for the user to input the desired air volume. The control unit 50 sets a target indoor temperature Tt on the basis of a set temperature Ts that has been input using the temperature setting switch 53. For example, suppose that the target indoor temperature Tt is (Ts+α1), which is the sum of the set temperature Ts and a certain value al. If a indoor temperature Tr is higher than the target indoor temperature Tt, the control unit 50 causes the air conditioner 1 to thermostat off. It will be noted that the control unit 50 causes the air conditioner 1 to thermostat on if the indoor temperature Tr is lower than a value (Ts−α2), which is the difference between the set temperature Ts and a certain value α2.

The control unit 50 controls the various devices configuring the air conditioner 1 on the basis of the measurement values of the various sensors and commands input from the remote controller 5. Furthermore, the control unit 50 uses the liquid crystal display 5*a* of the remote controller 5 to notify the user of the status of input commands and the status of control.

Figure 2:
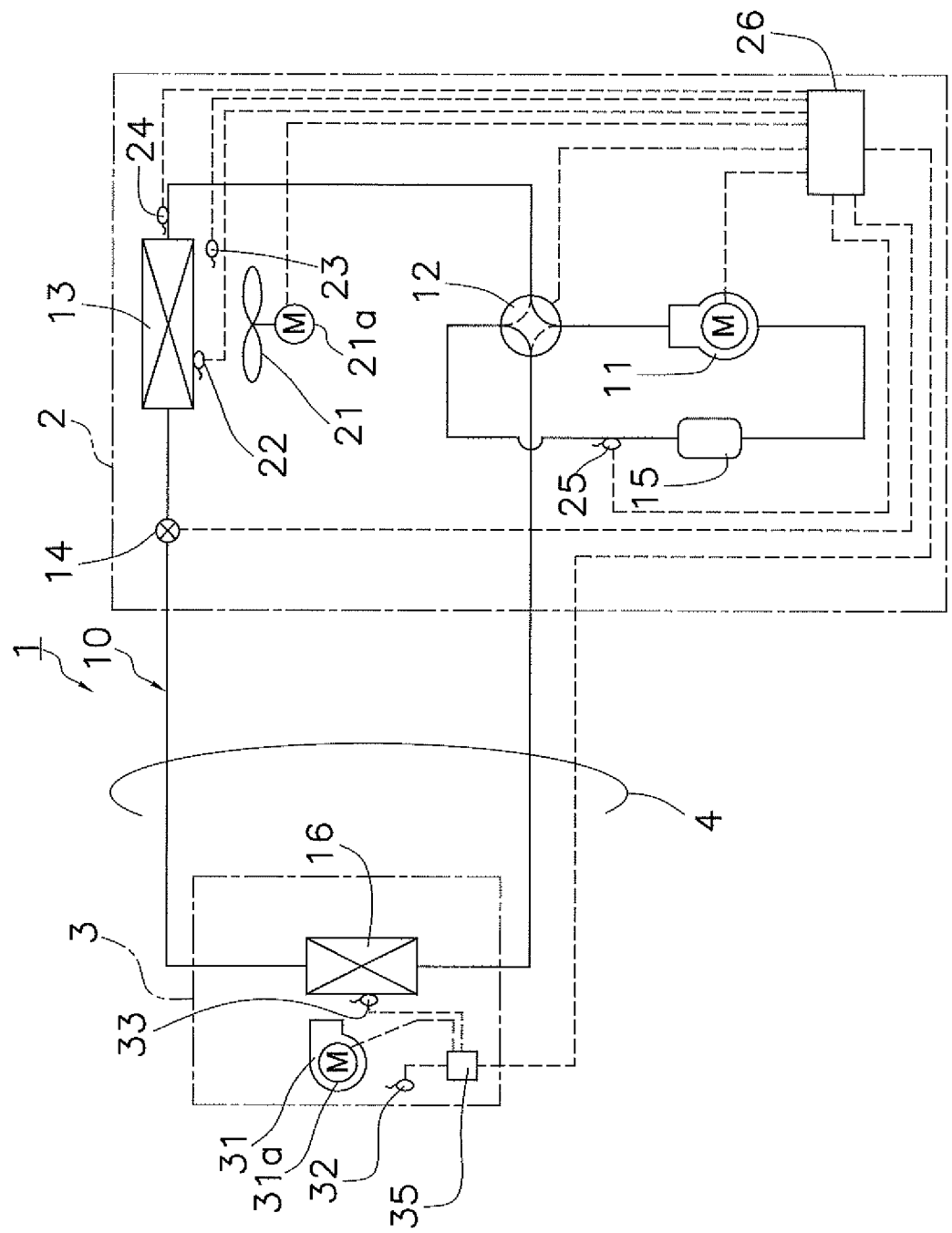
FIG. 2 is a circuit diagram showing a general overview of the configuration of the air conditioner pertaining to the embodiment.
Figure 4:
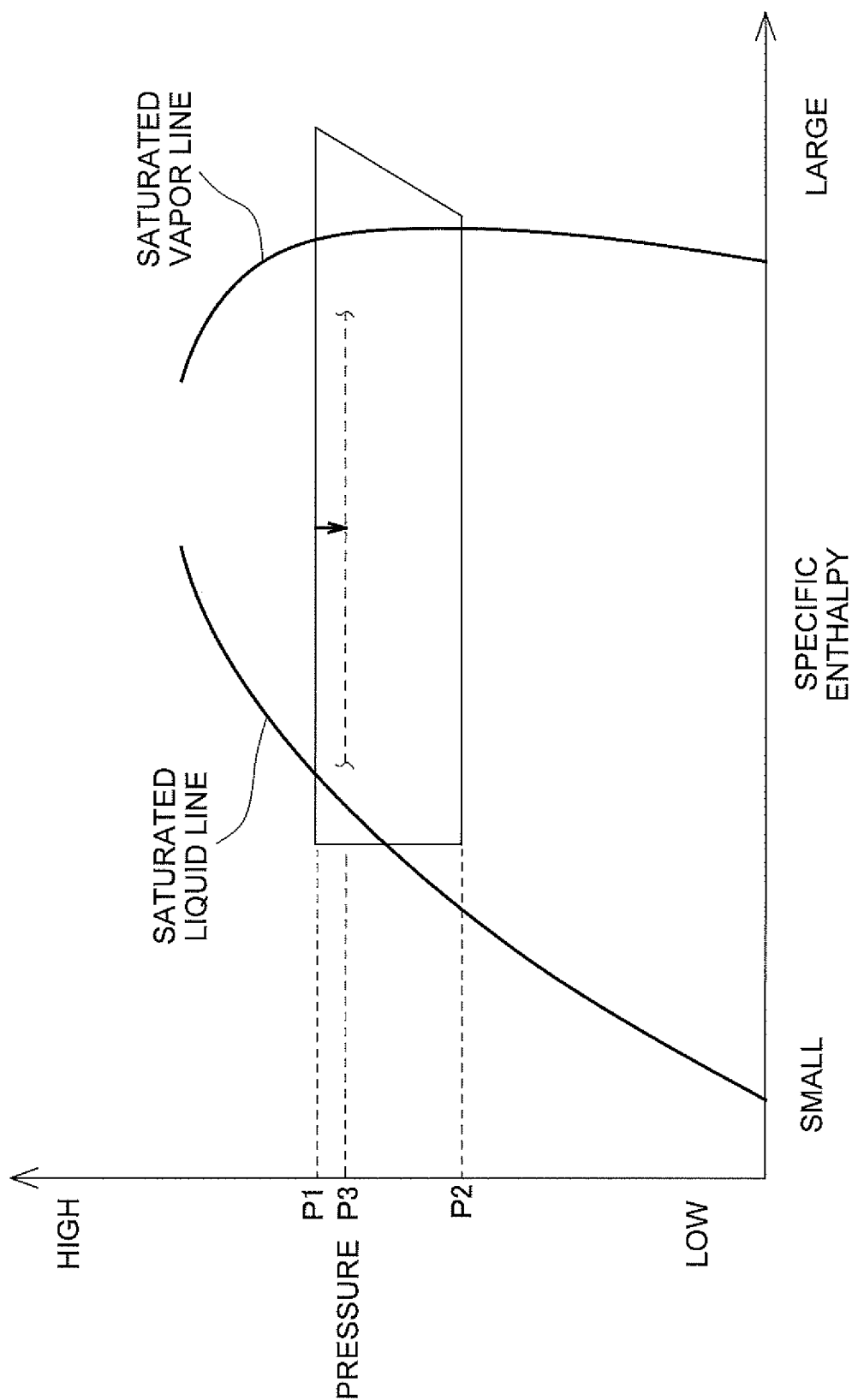
FIG. 4 is a p-h diagram for describing the concept of a refrigeration cycle in the air conditioner pertaining to the embodiment.

(2) General Overview of Heating Operation, Cooling Operation, and Reverse Cycle Defrost Operation (2-1) Heating Operation When the air conditioner 1 performs the heating operation, the four way valve 12 switches to the state indicated by the dashed lines shown in FIG. 2. That is, high-temperature high-pressure gas refrigerant discharged from the compressor 11 flows via the four way valve 12 into the indoor heat exchanger 16. At this time, the indoor heat exchanger 16 functions as a condenser. For that reason, as the refrigerant flows through the indoor heat exchanger 16, it exchanges heat with the indoor air and thereby warms the indoor air, is itself cooled, condenses, and changes from gas refrigerant to liquid refrigerant. The low-temperature high-pressure refrigerant whose heat has been taken away in the indoor heat exchanger 16 has its pressure reduced by the expansion mechanism 14 and changes to low-temperature low-pressure refrigerant. The refrigerant that has flowed via the expansion mechanism 14 into the outdoor heat exchanger 13 exchanges heat with the outdoor air and is thereby warmed, evaporates, and changes from liquid refrigerant to gas refrigerant. At this time, the outdoor heat exchanger 13 functions as an evaporator. Then, refrigerant comprising mainly low-temperature gas refrigerant is sucked from the outdoor heat exchanger 13 via the four way valve 12 and the accumulator 15 into the compressor 11. The repetition of this vapor compression refrigeration cycle, in which the refrigerant flows in the order of the compressor 11, the indoor heat exchanger 16, the expansion mechanism 14, and the outdoor heat exchanger 13, is a normal cycle. In FIG. 4 is shown the concept of a Mollier diagram (p-h diagram) in the heating operation. As shown in FIG. 4, the air conditioner 1 is configured in such a way that the refrigerant circulates while sequentially repeatedly undergoing the four state changes of evaporation, compression, condensation, and expansion. A high-pressure value P1 of the refrigerant circuit 10 shown in FIG. 1 is the condensation pressure of the indoor heat exchanger 16, and a low-pressure value P2 of the refrigerant circuit 10 is the evaporation pressure of the outdoor heat exchanger 13. The high-pressure value P1 (condensation pressure) is substantially the same as the discharge pressure of the compressor 11.

(2-2) Cooling Operation

When the air conditioner 1 performs the cooling operation, the four way valve 12 switches to the state indicated by the solid lines shown in FIG. 2. That is, high-temperature high-pressure gas refrigerant discharged from the compressor 11 flows via the four way valve 12 into the outdoor heat exchanger 13. At this time, the outdoor heat exchanger 13 functions as a condenser. For that reason, as the refrigerant flows through the outdoor heat exchanger 13, it exchanges heat with the outdoor air and is thereby cooled, condenses, and changes from gas refrigerant to liquid refrigerant. The low-temperature high-pressure refrigerant whose heat has been taken away in the outdoor heat exchanger 13 has its pressure reduced by the expansion mechanism 14 and changes to low-temperature low-pressure refrigerant. The refrigerant that has flowed via the expansion mechanism 14 into the indoor heat exchanger 16 exchanges heat with the indoor air and thereby cools the indoor air, is itself warmed, evaporates, and changes from liquid refrigerant to gas refrigerant. At this time, the indoor heat exchanger 16 functions as an evaporator. Then, refrigerant comprising mainly low-temperature gas refrigerant is sucked from the indoor heat exchanger 16 via the four way valve 12 and the accumulator 15 into the compressor 11.

(2-3) Reverse Cycle Defrost Operation

The reverse cycle defrost operation is performed to remove frost sticking to the outdoor heat exchanger 13 owing to the heating operation having been performed. Consequently, the air conditioner 1 switches to the reverse cycle defrost operation in the middle of the heating operation, and when the reverse cycle defrost operation ends, the air conditioner 1 reverts back to the heating operation. In the reverse cycle defrost operation, as in the cooling operation, the four way valve 12 switches to the state indicated by the solid lines shown in FIG. 2. Additionally, in the reverse cycle defrost operation also, the same vapor compressor refrigeration cycle as in the cooling operation is repeated. Namely, what is performed in the reverse cycle defrost operation conversely from the normal cycle in the heating operation is a reverse cycle that repeats a vapor compression refrigeration cycle in which the refrigerant flows in the order of the compressor 11, the outdoor heat exchanger 13, the expansion mechanism 14, and the indoor heat exchanger 16. In the reverse cycle defrost operation, a high-pressure value P3 of the refrigerant circuit 10 indicated by the dashed lines in FIG. 4 is the condensation pressure of the outdoor heat exchanger 13 functioning as a condenser. In FIG. 4 parts other than the high-pressure value P3 of the refrigerant circuit 10 in the reverse cycle defrost operation are omitted, but in the reverse cycle defrost operation also, as in the heating operation, the refrigerant circulates while sequentially repeatedly undergoing the four state changes of evaporation, compression, condensation, and expansion. The high-pressure value P3 (condensation pressure) is substantially the same as the discharge pressure of the compressor 11. As shown in FIG. 4, the high-pressure value P3 of the refrigerant circuit 10 in the reverse cycle defrost operation is set lower in comparison to the high-pressure value P1 of the refrigerant circuit 10 in the heating operation.

When the air conditioner 1 enters the reverse cycle defrost operation, the outdoor control device 26 of the outdoor unit 2 decides to perform defrosting when heating control is being performed. When the outdoor control device 26 decides to perform defrosting in the outdoor unit 2, a defrost request flag shown in FIG. 8(b) changes from "0" to "1" and a defrost request signal is sent from the outdoor control device 26 of the outdoor unit 2 to the indoor control device 35 of the indoor unit 3.

When completing preparations for the defrost operation conclude in the indoor unit 3 that has received the defrost request signal, the indoor control device 35 sends a defrost permission signal to the outdoor control device 26. When the outdoor control device 26 receives the defrost permission signal, the outdoor control device 26 starts defrost control and sends to the indoor control device 35 a signal indicated that defrosting is currently in progress.

When the outdoor control device 26 judges that defrosting has ended in the outdoor unit 2, the defrost request flag in FIG. 8(b) changes from "1" to "0" and a normal notification signal notifying the indoor control device 35 of the indoor unit 3 that the air conditioner 1 will return to the normal heating operation is sent from the outdoor control device 26 to the indoor control device 35. The indoor unit 3 that has received the normal notification signal reverts to heating control for the heating operation.

(3) Shock Sound when Four Way Valve is Working (3-1) Configuration of Four Way Valve 12

Figure 5:
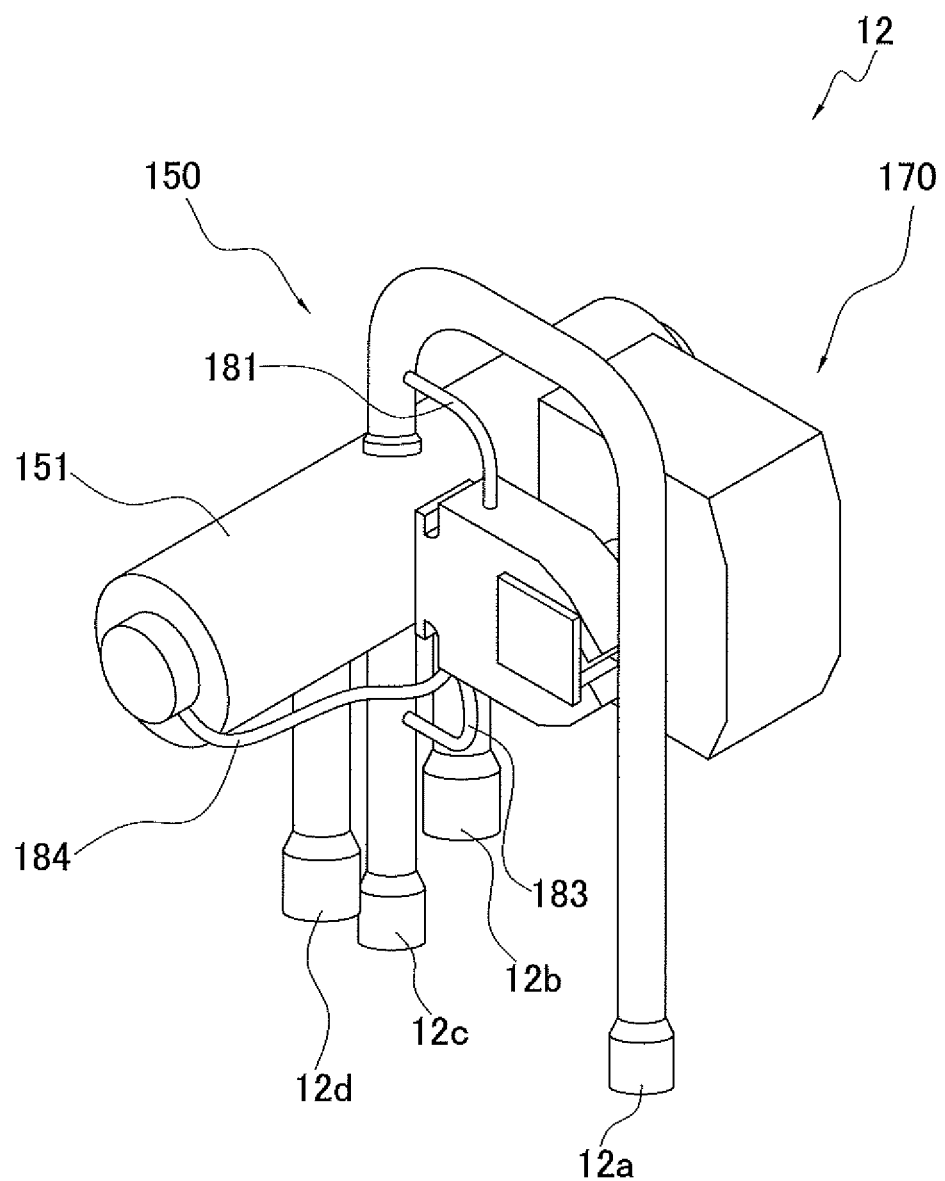
FIG. 5 is a perspective view of a four way valve.
Figure 6:
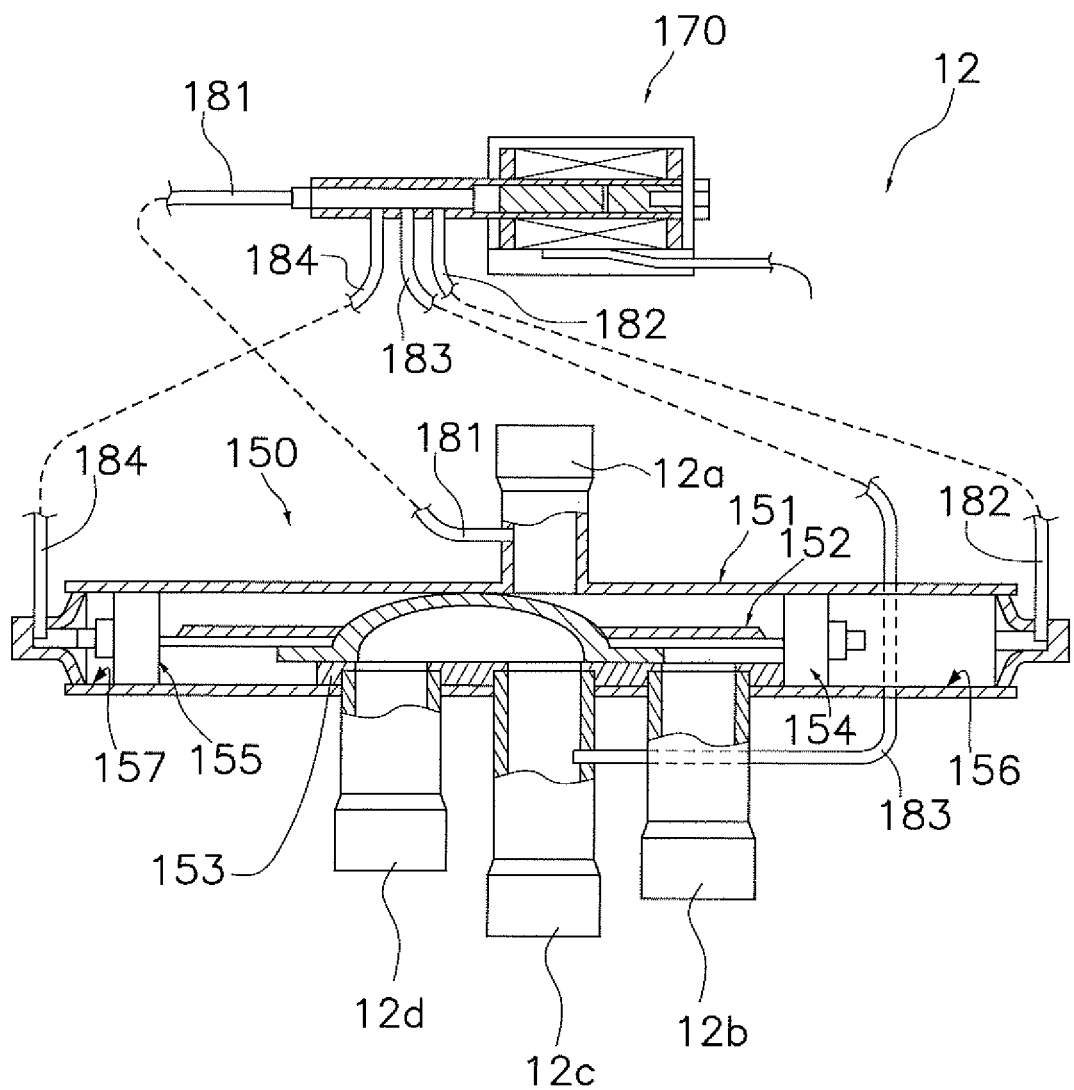
FIG. 6 is a schematic sectional view for describing the state of the four way valve during a defrost operation.
Figure 7:
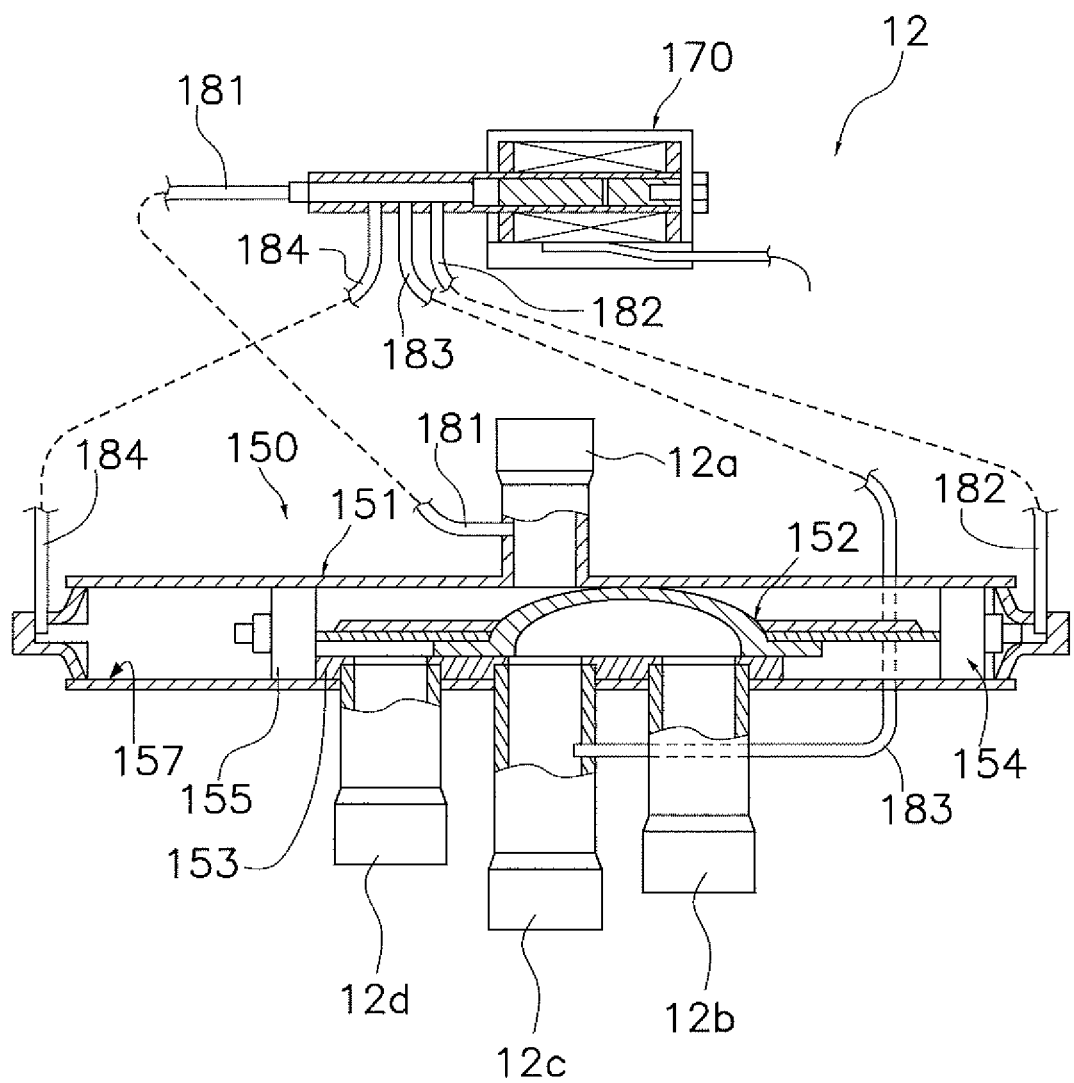
FIG. 7 is a schematic sectional view for describing the state of the four way valve during a heating operation.

FIG. 5 is a perspective view of the four way valve 12. Furthermore, FIG. 6 and FIG. 7 are schematic sectional views for describing the configuration of the four way valve 12. In FIG. 5, FIG. 6, and FIG. 7, the four way valve 12 is equipped with a body mechanism 150 and a pilot mechanism 170. The body mechanism 150 has a cylinder 151, a slide mount 153, and a slide valve 152 (see FIG. 6).

The slide mount 153 is a mount disposed inside the central section of the cylinder 151. A third port 12c is disposed in the center of the slide mount 153, and a second port 12b and a fourth port 12d are provided on both sides of the third port 12c along the axial direction of the cylinder. In the cylinder 151, a first port 12a is provided in a position opposing the third port 12c of the slide mount 153.

The first port 12a is connected to the discharge port of the compressor 11, so during the heating operation, high pressure acts on the first port 12a. The third port 12c is connected to the suction opening of the compressor 11, so during the heating operation, only low pressure acts on the third port 12c. As for the second port 12b and the fourth port 12d, when operation switches between the cooling operation and the heating operation, the slide valve 152 moves and high pressure and low pressure alternately act on the second port 12b and the fourth port 12d. The state shown in FIG. 6 is a state during the reverse cycle defrost operation or during the cooling operation and is the state of connection indicated by the solid lines in FIG. 2. The state shown in FIG. 7 is a state during the heating operation and is the state of connection indicated by the dashed lines in FIG. 2.

In order to switch between the cooling operation or the reverse cycle defrost operation (the state shown in FIG. 6) and the heating operation (the state shown in FIG. 7), the slide valve 152 is disposed inside the cylinder 151 and is configured in such a way that it may freely slide in the axial direction of the cylinder 151. The slide valve 152 slides on the slide mount 153. Furthermore, the slide valve 152 is processed in such a way that its central portion is shaped like an upside-down U. The slide valve 152 connects in such a way that the refrigerant can flow through it between mutually adjacent ports because of the upside-down U-shaped section. Partition members 154 and 155 are on both sides of the slide valve 152, a first chamber 156 is formed between the partition member 154 and the cylinder 151, and a second chamber 157 is formed between the partition member 155 and the cylinder 151. The slide valve 152 is driven by the pressure difference between the first chamber 156 and the second chamber 157.

The body mechanism 150 and the pilot mechanism 170 are connected to each other by four pilot tubes comprising a first pilot tube 181, a second pilot tube 182, a third pilot tube 183, and a fourth pilot tube 184. The first pilot tube 181 is connected to the first port 12a. The third pilot tube 183 is connected to the third port 12c. Furthermore, the second pilot tube 182 is connected to the first chamber 156, and the fourth pilot tube 184 is connected to the second chamber 157.

The pilot mechanism 170 uses a built-in spring and electromagnet to switch connection from the first pilot tube 181 to the third pilot tube 183. This switches the four way valve 12 between the state shown in FIG. 6, which switches the first chamber 156 of the cylinder 151 of the body mechanism 150 to a low pressure and switches the second chamber 157 to a high pressure (hereinafter called a "left-position state"), and the state shown in FIG. 7, which switches the first chamber 156 to a high pressure and switches the second chamber 157 to a low pressure (hereinafter called a "right-position state").

(3-2) Working of Four Way Valve 12

In the four way valve 12 with the above configuration, in the left-position state, the slide valve 152 inside the cylinder 151 is positioned on the left side as shown in FIG. 6, so that the first port 12a and the second port 12b communicate with each other and the fourth port 12d and the third port 12c communicate with each other. In the left-position state, the first pilot tube 181 and the second pilot tube 182 are connected to each other, and the third pilot tube 183 and the fourth pilot tube 184 are connected to each other. When the electromagnet of the pilot mechanism 170 is excited in the left-position state, the first pilot tube 181 and the fourth pilot tube 184 become connected to each other, the second pilot tube 182 and the third pilot tube 183 become connected to each other, and the pressure difference between both ends of the cylinder 151 becomes a pressure difference whereby the slide valve 152 moves to the right side. When the slide valve 152 moves to the right side and switches to the right-position state, the first port 12a and the fourth port 12d communicate with each other and the third port 12c and the second port 12b communicate with each other.

When the excitation of the electromagnet of the pilot mechanism 170 is stopped in the right-position state, the first pilot tube 181 and the second pilot tube 182 become connected to each other, the third pilot tube 183 and the fourth pilot tube 184 become connected to each other, and the pressure difference between both ends of the cylinder 151 becomes a pressure difference whereby the slide valve 152 moves to the left side. When the slide valve 152 moves to the left side, the first port 12a and the second port 12b communicate with each other and the fourth port 12d and the third port 12c communicate with each other.

(3-3) Mechanism by which Shock Sound Occurs

During the heating operation, for example, the electromagnet of the pilot mechanism 170 is not excited, so the slide valve 152 is in the right-position state shown in FIG. 7, so that the first port 12a and the fourth port 12d communicate with each other and the second port 12b and the third port 12c communicate with each other. When a command to move to the reverse cycle defrost operation comes in at this time, the pressure difference between both ends of the cylinder 151 becomes a pressure difference whereby the slide valve 152 moves to the left side, and the slide valve 152 moves to the left side. As a result, the first port 12a and the second port 12b communicate with each other and the third port 12c and the fourth port 12d communicate with each other. If the switching of the four way valve 12 ends up being performed without the pressure difference between the first port 12a and the second port 12b being eliminated, the high pressure from the first port 12a suddenly acts on the second port 12b that until just before had been at a lower pressure, so an shock sound occurs because of the impact at that time. Although description will be given later, when the air conditioner 1 reverts to the heating operation from the reverse cycle defrost operation, reducing as much as possible the shock sound by eliminating as much as possible this pressure difference is performed.

(4) Working in Reverse Cycle Defrost Operation (4-1) Start of Reverse Cycle Defrost Operation The working of the air conditioner 1 in the reverse cycle defrost operation will be described using the timing charts shown in FIG. 8(a) to FIG. 8(g). Looking at the timing chart of the defrost request flag shown in FIG. 8(g), at time t1 the defrost request flag changes from "0" to "1", and at this timing a defrost request signal is sent from the outdoor control device 26 to the indoor control device 35 of the control unit 50. Furthermore, at time t1, as shown in FIG. 8(d), in the indoor unit 3 that has received the defrost request signal, an upper limit on the rotational speed of the indoor fan 31 is switched from a limit in the normal heating operation to a limit for defrosting. In the normal heating operation, for example, the upper limit on the rotational speed of the indoor fan 31 is provided in correspondence to the maximum air volume that can be input by the air volume setting switch 54. With respect thereto, when the limit for defrosting is imposed on the indoor fan 31, even if the air volume has been set to the maximum air volume by the air volume setting switch 54, the control unit 50 limits the rotational speed of the indoor fan 31 to a rotational speed that is smaller than the rotational speed at the maximum air volume. Because this limit for defrosting is provided on the rotational speed of the indoor fan 31, the feeling of discomfort that the user feels because of cool air blown out in the defrost operation is suppressed. Additionally, in the outdoor unit 2, control that gradually lowers the operating frequency of the compressor 11 is started beginning at time t1 by the outdoor control device 26.

Looking at the timing chart in FIG. 8(a), which shows the operating frequency of the compressor 11, it will be understood that at time t2 the compressor 11 reaches a predetermined operating frequency Fmin. In this heating operation, the rate of decrease (normal frequency decrease rate) in the operating frequency when it reaches time t2 from time t1 is, for example, 2 Hz/sec. In the air conditioner 1, the rate of increase in the operating frequency in the heating operation is also set to 2 Hz/sec. When the operating frequency of the compressor 11 reaches the predetermined operating frequency Fmin and a predetermined amount of time has elapsed at time t3, pressure equalization that reduces the pressure difference between the indoor heat exchanger 16 side (first port 12*a*) of the four way valve 12 and the outdoor heat exchanger 13 side (third port 12*c*) of the four way valve 12 concludes.

Figure 8:
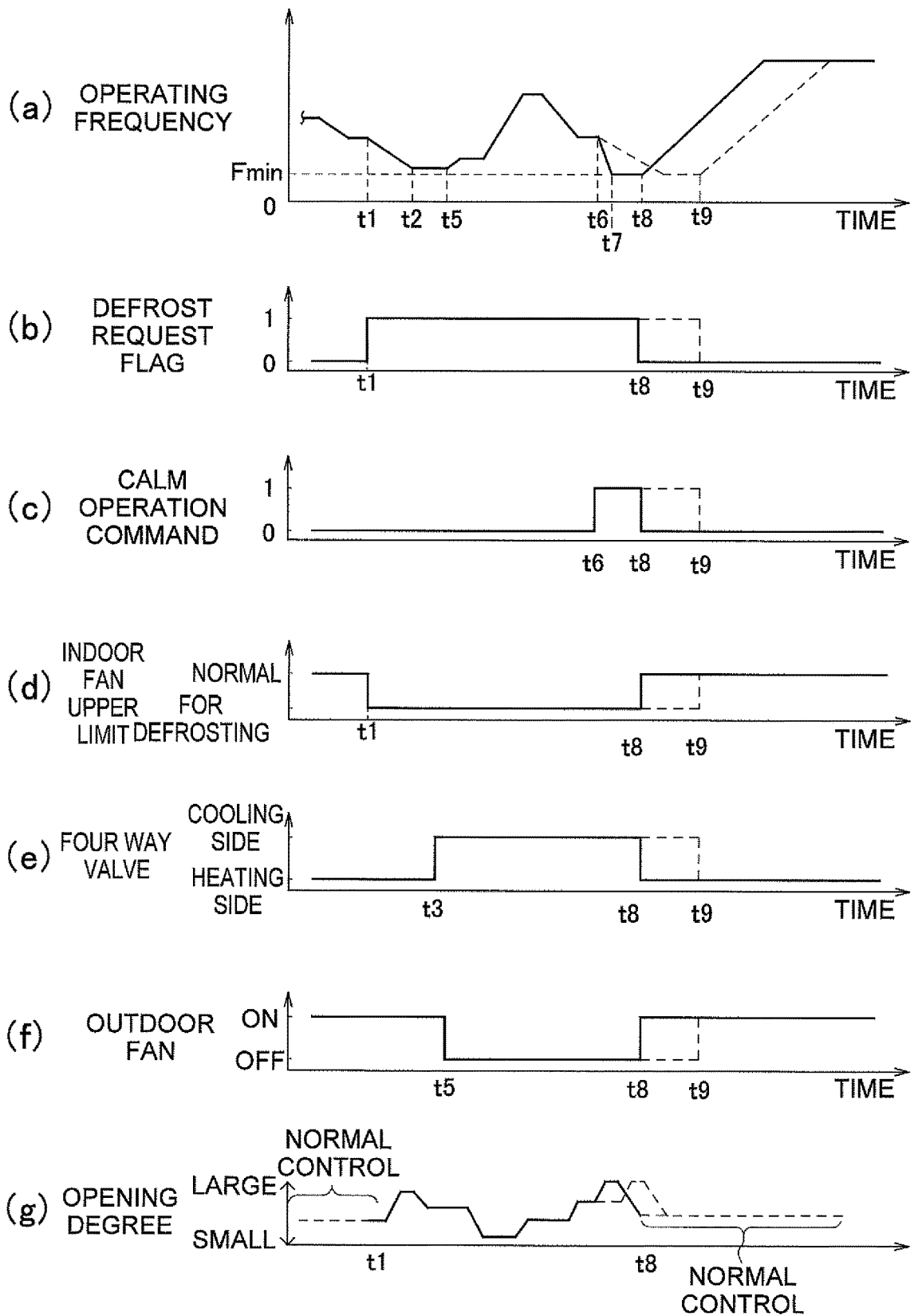
FIG. 8(a) is a timing chart relating to the operating frequency of the compressor.
FIG. 8(b) is a timing chart relating to a defrost request flag.
FIG. 8(c) is a timing chart relating to a calm operation command.
FIG. 8(d) is a timing chart relating to an indoor fan upper limit.
FIG. 8(e) is a timing chart relating to the switching of the four way valve.
FIG. 8(f) is a timing chart relating to the switching on/off of an outdoor fan.
FIG. 8(g) is a timing chart relating to the opening degree of an expansion mechanism.

As shown in FIG. 8(*e*), at time t3 when pressure equalization has been performed and switching of the four way valve 12 has become possible, the four way valve 12 is switched from the heating side to the cooling side. Namely, the state of connection of the four way valve 12 shown in FIG. 5 is switched from the state of connection indicated by the dashed lines in FIG. 2 to the state of connection indicated by the solid lines. When the four way valve 12 switches, thereafter the compressor 11 starts to increase its rotational speed (time t5 in FIG. 8(*a*)).

(4-2) Control During Reverse Cycle Defrost Operation

During the reverse cycle defrost operation, the operating frequency of the compressor 11 (see FIG. 8(*a*)) and the opening degree of the expansion valve 14 (see FIG. 8(*b*)) are controlled by the outdoor control device 26 in accordance with a sequence stored in the memory. The outdoor control device 26 performs a defrost conclusion determination for ending the defrost operation. When a determination to conclude the defrost operation is reached in the defrost conclusion determination for ending the defrost operation, as shown in FIG. 8(*c*), at time t6 a calm operation command changes from "0" to "1" and a command to perform a calm operation is given. When the calm operation command is given, the outdoor control device 26 gradually lowers the operating frequency of the compressor 11 to the calm operation frequency Fmin (time t7) and maintains the calm operation frequency Fmin for a predetermined amount of time (t8–t7). At time t6 when the calm operation command is given, the high-pressure value P3 of the refrigerant circuit 10 is lower than the high-pressure value P1 of the refrigerant circuit 10 in the heating operation as shown in FIG. 4. For that reason, the rate of decrease (end-of-defrost frequency decrease rate) in the operating frequency of the compressor 11 is set, for example, to 10 Hz/sec. For example, the rotational frequency of the compressor 11 that had been operated at several tens of Hz is lowered in several seconds to ten or so Hz (the calm operation frequency Fmin). Here, the end-of-defrost frequency decrease rate is set to five times the normal frequency decrease rate, but an improvement in heating capacity can be expected even when the end-of-defrost frequency decrease rate is set, for example, to two or more times the normal frequency decrease rate. While the reverse cycle defrost operation (defrost operation) is in progress, the heating operation is interrupted. Consequently, it becomes easier to obtain a higher heating capacity, and particularly a higher low-temperature heating capacity, the larger the value of heating operation time÷(heating operation time+defrost operation time) is. Furthermore, by switching from the reverse cycle defrost operation to the heating operation in a state in which the calm operation frequency Fmin is maintained without stopping the compressor 11, it becomes easier to obtain an even higher low-temperature heating capacity.

Because of the calm operation from time t6 to time t8, the pressure difference between the first port 12*a* and the third port 12*c* of the four way valve 12 can be mitigated. Because of that, in comparison to the case of not performing the calm operation, for example, by performing the calm operation, the shock sound of the four way valve 12 is extremely remarkedly suppressed. Then, when the pressure equalization of the four way valve 12 has ended, as shown in FIG. 8(*e*), the four way valve 12 is switched from the connection indicated by the solid lines to the connection indicated by the dashed lines, namely, the path whereby the refrigerant discharged from the compressor 11 is sent to the indoor heat exchanger 16 and the refrigerant flowing out from the outdoor heat exchanger 13 is sucked into the compressor 11 (time t8). Furthermore, when the calm operation concludes, the outdoor control device 26 of the control unit 50 changes the calm operation command from "1" to "0" and starts increasing the operating frequency of the compressor 11. At this time, as shown in FIG. 8(*f*), the outdoor control device 26 starts driving the outdoor fan 21. Additionally, beginning at time t8 the indoor control device 35 also changes the upper limit on the rotational speed of the indoor fan 31 from the limit for defrosting to the normal limit.

(5) Example Modifications (5-1) Example Modification A

In the above embodiment, the four way valve 12 was described as the switching mechanism, but the switching mechanism is not limited to the four way valve 12. The switching mechanism may also be a switching mechanism other than a four way valve provided that it is used to switch between the heating operation and the defrost operation and requires pressure equalization between the port connected to the discharge port of the compressor 11 and the port connected to the suction port of the compressor in order to suppress noise when switching between these operations.

(5-2) Example Modification B

In the above embodiment, a case was described where the calm operation frequency from time t7 to time t8 in FIG. 8(*a*) was constant, but the calm operation frequency during this period may also be changed provided that it is in a range in which pressure equalization can be performed.

(6) Characteristics (6-1)

As described above, in the air conditioner 1 that is the refrigeration apparatus pertaining to the embodiment of the invention, the end-of-defrost frequency decrease rate of the compressor 11 during the defrost operation from time t6 to time t7 shown in FIG. 8(*a*) is faster than the normal frequency decrease rate of the compressor 11 from time t1 to time t2, for example. As a result, by shortening the amount of time from time t6 to time t7, the compressor 11 can be made to quickly reach an operating frequency at which pressure equalization of the four way valve 12 that is the switching mechanism is possible when ending the defrost operation, so the amount of time until switching the four way valve 12 can be shortened. For example, if the operating frequency were to be decreased at the normal frequency decrease rate beginning at time t6, the decrease would take until time t9 in FIG. 8(*a*) and the defrost operation time would become longer. By shortening the amount of time until the compressor 11 reaches the same calm operation frequency Fmin, the defrost operation time is shortened, noise that occurs when reverting to the heating operation is suppressed, and it becomes easy to ensure heating capacity.

(6-2)

In the above air conditioner 1, because the end-of-defrost frequency decrease rate is set to 10 Hz/sec, which is a decrease rate that is two or more times the normal frequency decrease rate of 2 Hz/sec, the effect of shortening the defrost operation time becomes greater. Of course, it is preferable for the decrease rate to be as short as possible to the extent that the compressor 11 is not adversely affected, and even more preferable for the end-of-defrost decrease rate to be five or more times the normal frequency decrease rate (end-of-defrost frequency decrease rate/normal frequency decrease rate) as in the above embodiment.

FIG. 8(a) shows, with dashed lines, the working of the compressor 11 in a case where the operating frequency of the compressor 11 is decreased beginning at time t6 at the normal frequency decrease rate instead of the end-of-defrost frequency decrease rate. As will be understood by comparing the dashed lines and the solid lines, the amount of time from time t8 to time t9 is shortened in comparison to what has conventionally been the case. As a result, it will be understood that by shortening the defrost operation time by an amount corresponding to time t8 to time t9, the value {heating operation time÷(heating operation time+defrost operation time)} relating to heating capacity in the above embodiment becomes greater than what has conventionally been the case, and it becomes easier to improve heating capacity.

(6-3)

In the above air conditioner 1, as shown in FIG. 8(a), maintaining the calm operation frequency Fmin (an example of maintaining an operating frequency equal to or greater than a predetermined value) without the compressor 11 stopping when reverting from the defrost-operation to the heating operation (between time t6 and time t8) means that the compressor 11 is driven at an operating frequency equal to or greater than a predetermined value when it has reverted to the heating operation. As a result, in comparison to the conventional case where the compressor 11 had stopped when reverting to the heating operation, for example, the compressor can be increased in a short amount of time to the necessary operating frequency, and it becomes easy to ensure a low-temperature heating capacity.

(6-4)

By maintaining a constant operating frequency over a predetermined amount of time before entering the heating operation as in the period from time t7 to time t8 in FIG. 8(a) after the operating frequency has been changed at the end-of-defrost frequency decrease rate, pressure equalization of the four way valve 12 that is the switching mechanism can be sufficiently performed. As a result, noise that occurs in the four way valve 12 can be suppressed even when the compressor 11 is driven at the calm operation frequency Fmin without stopping when reverting to the heating operation.

REFERENCE SIGNS LIST

1 Air Conditioner (Example of Refrigeration Apparatus)
2 Outdoor Unit
3 Indoor Unit
10 Refrigerant Circuit
11 Compressor
12 Four way valve (Example of Switching Mechanism)
13 Outdoor Heat Exchanger (Example of Evaporator in Heating Operation)
14 Expansion Mechanism
16 Indoor Heat Exchanger (Example of Condenser in Heating Operation)
21 Outdoor Fan
22 Outdoor Temperature Sensor
23 Outdoor Heat Exchanger Temperature Sensor
24 Outdoor Control Device
31 Indoor Fan
32 Indoor Temperature Sensor
33 Indoor Heat Exchanger Temperature Sensor
34 Indoor Control Device
50 Control Unit

CITATION LIST

Patent Literature

Patent Document 1: Japanese Patent Unexamined Publication No. 2014-129957

The invention claimed is:

1. A refrigeration apparatus including a refrigerant circuit in which a vapor compression refrigeration cycle is performed, the refrigeration apparatus comprising:
    a compressor that is provided in the refrigerant circuit and whose operating frequency is capable of being changed;
    an evaporator that is provided in the refrigerant circuit and is for performing heat exchange by causing refrigerant circulated by the compressor to evaporate in a heating operation;
    a condenser that is provided in the refrigerant circuit and is for performing heat exchange by causing the refrigerant circulated by the compressor to condense in the heating operation; and
    a switching mechanism that is provided in the refrigerant circuit and is for switching the flow of the refrigerant in the refrigerant circuit when switching between the heating operation using the condenser and a defrost operation that defrosts the evaporator,
    wherein the refrigerant circuit is configured in such a way that a discharge pressure value of the compressor in the defrost operation is lower than a discharge pressure value of the compressor in the heating operation, and
    an end-of-defrost frequency decrease rate being a rate of decrease in the operating frequency of the compressor when ending the defrost operation is set faster than a normal frequency decrease rate being a rate of decrease in the operating frequency of the compressor when transitioning from the heating operation to the defrost operation.

2. The refrigeration apparatus according to claim 1, wherein the end-of-defrost frequency decrease rate is set to a rate of decrease that is two or more times the normal frequency decrease rate.

3. The refrigeration apparatus according to claim 1, wherein the compressor is arranged and configured to maintain an operating frequency equal to or greater than a predetermined value, without stopping, when reverting from the defrost operation to the heating operation.

4. The refrigeration apparatus according to claim 3, wherein after the operating frequency has been changed at the end-of-defrost frequency decrease rate, the compressor is arranged and configured to maintain a constant operating frequency over a predetermined amount of time before entering the heating operation.

5. The refrigeration apparatus according to claim 2, wherein the compressor is arranged and configured to maintain an operating frequency equal to or greater than a predetermined value, without stopping, when reverting from the defrost operation to the heating operation.

6. The refrigeration apparatus according to claim 5, wherein after the operating frequency has been changed at the end-of-defrost frequency decrease rate, the compressor is arranged and configured to maintain a constant operating frequency over a predetermined amount of time before entering the heating operation.

\* \* \* \* \*